United States Patent
Diamond et al.

(10) Patent No.: US 11,487,914 B2
(45) Date of Patent: Nov. 1, 2022

(54) COMPONENT LAYOUT OPTIMIZATION

(71) Applicant: Ford Global Technologies, LLC, Dearborn, MI (US)

(72) Inventors: Brendan Diamond, Grosse Pointe, MI (US); Kevin James Rhodes, Dearborn, MI (US); Erik J. Christen, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 573 days.

(21) Appl. No.: 16/420,064

(22) Filed: May 22, 2019

(65) Prior Publication Data

US 2020/0372126 A1 Nov. 26, 2020

(51) Int. Cl.
*G06G 7/48* (2006.01)
*G06F 30/15* (2020.01)
*B62D 65/00* (2006.01)
*G06F 111/20* (2020.01)

(52) U.S. Cl.
CPC ............ *G06F 30/15* (2020.01); *B62D 65/00* (2013.01); *G06F 2111/20* (2020.01)

(58) Field of Classification Search
CPC ..... B62D 65/00; G06F 2111/20; G06F 30/15; G06F 30/394
See application file for complete search history.

(56) References Cited

U.S. PATENT DOCUMENTS

| | | |
|---|---|---|
| 6,973,361 B1 | 12/2005 | Hammond et al. |
| 8,417,652 B2 | 4/2013 | Fox et al. |
| 8,996,235 B2 | 3/2015 | Singh et al. |
| 9,245,239 B2 | 1/2016 | Falkenauer |
| 2007/0239363 A1 | 10/2007 | Reaume et al. |
| 2009/0152392 A1* | 6/2009 | Hogan ............... B64F 5/00 244/36 |
| 2018/0096539 A1 | 4/2018 | Merg et al. |

OTHER PUBLICATIONS

Gagan, Jonathan, Drew Degentesh, and Su Yin. "A simulated annealing-based algorithm using hierarchical models for general three-dimensional component layout." Computer-aided design 30.10 (1998): 781-790.*

Aladahalli, Chandankumar, Jonathan Cagan, and Kenji Shimada. "Objective function effect based pattern search—theoretical framework inspired by 3D component layout." (2007): 243-254.*

Pillai, A. C., et al. "Offshore wind farm electrical cable layout optimization." Engineering Optimization 47.12 (2015): 1689-1708.*

(Continued)

*Primary Examiner* — Rehana Perveen
*Assistant Examiner* — Nithya J. Moll
(74) *Attorney, Agent, or Firm* — Brandon Hicks; Bejin Bieneman PLC

(57) ABSTRACT

A system and a method are described for laying out components in a vehicle workspace. The method may comprise: receiving, as input, a plurality of components for a vehicle workspace; determining an optimization of a routing of a plurality of connections, each of which connect to at least one of the plurality of components; and providing an output indicative of the routing within the vehicle workspace.

18 Claims, 11 Drawing Sheets

(56) References Cited

OTHER PUBLICATIONS

Moraes, F., et al. "Estimation of layout densities for CMOS digital circuits." Proceeding International Workshop on Power and Timing Modeling Optimization Simulation (PATMOS'98). 1998.*

Cagan, Jonathan, Kenji Shimada, and Sun Yin. "A survey of computational approaches to three-dimensional layout problems." Computer-Aided Design 34.8 (2002): 597-611.*

Michalek, Jeremy, Ruchi Choudhary, and Panos Papalambros. "Architectural layout design optimization." Engineering optimization 34.5 (2002): 461-484.*

Lei, Jun, Yasuhiro Yamada, and Yoshiaki Komura. "Layout optimization of manufacturing cells using particle swarm optimization." SICE 2003 Annual Conference (IEEE Cat. No. 03TH8734). vol. 1. IEEE, 2003.*

Dong, Hong, Paolo Guarneri, and Georges Fadel. "Bi-level approach to vehicle component layout with shape morphing." (2011): 041008.*

* cited by examiner 300 continued

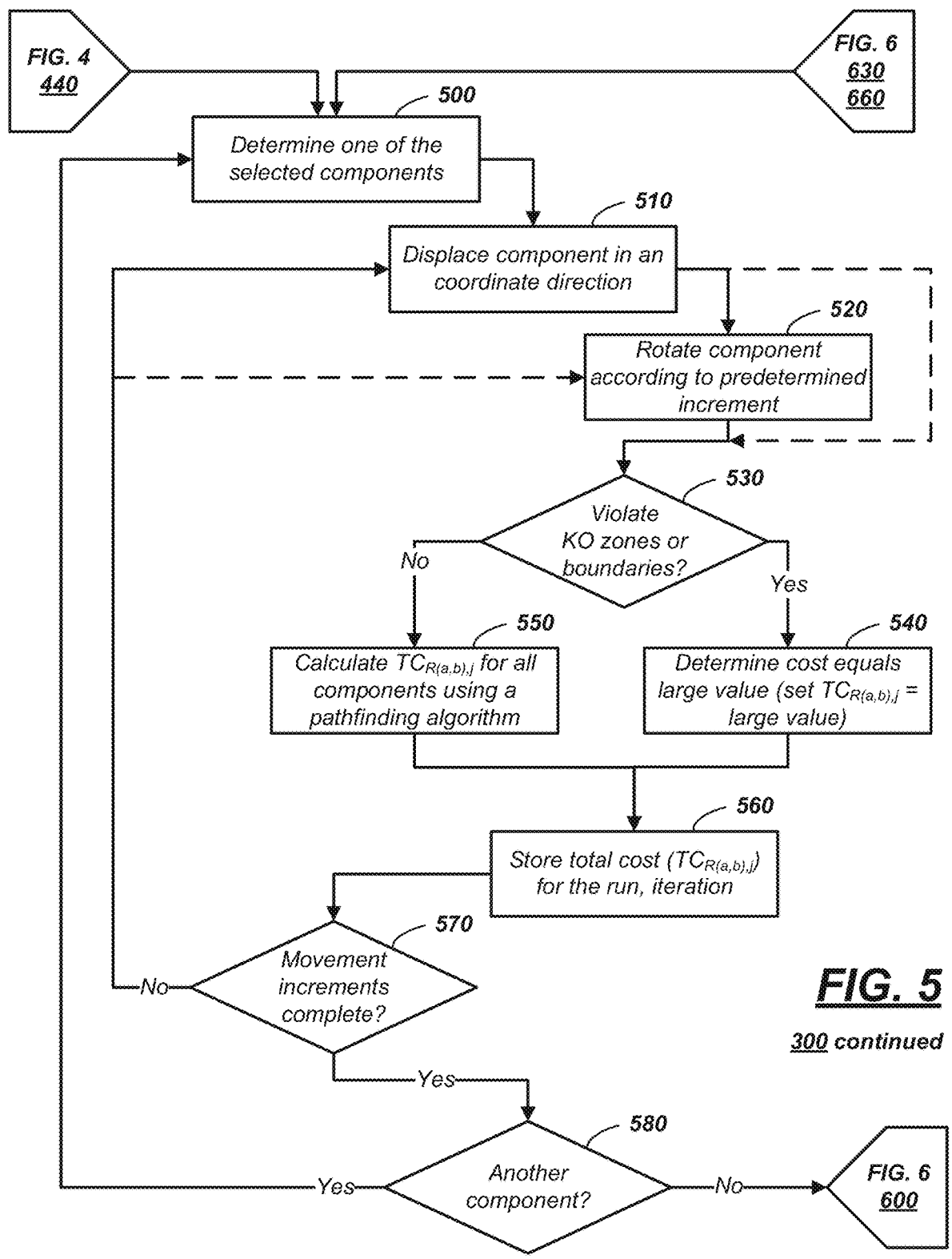

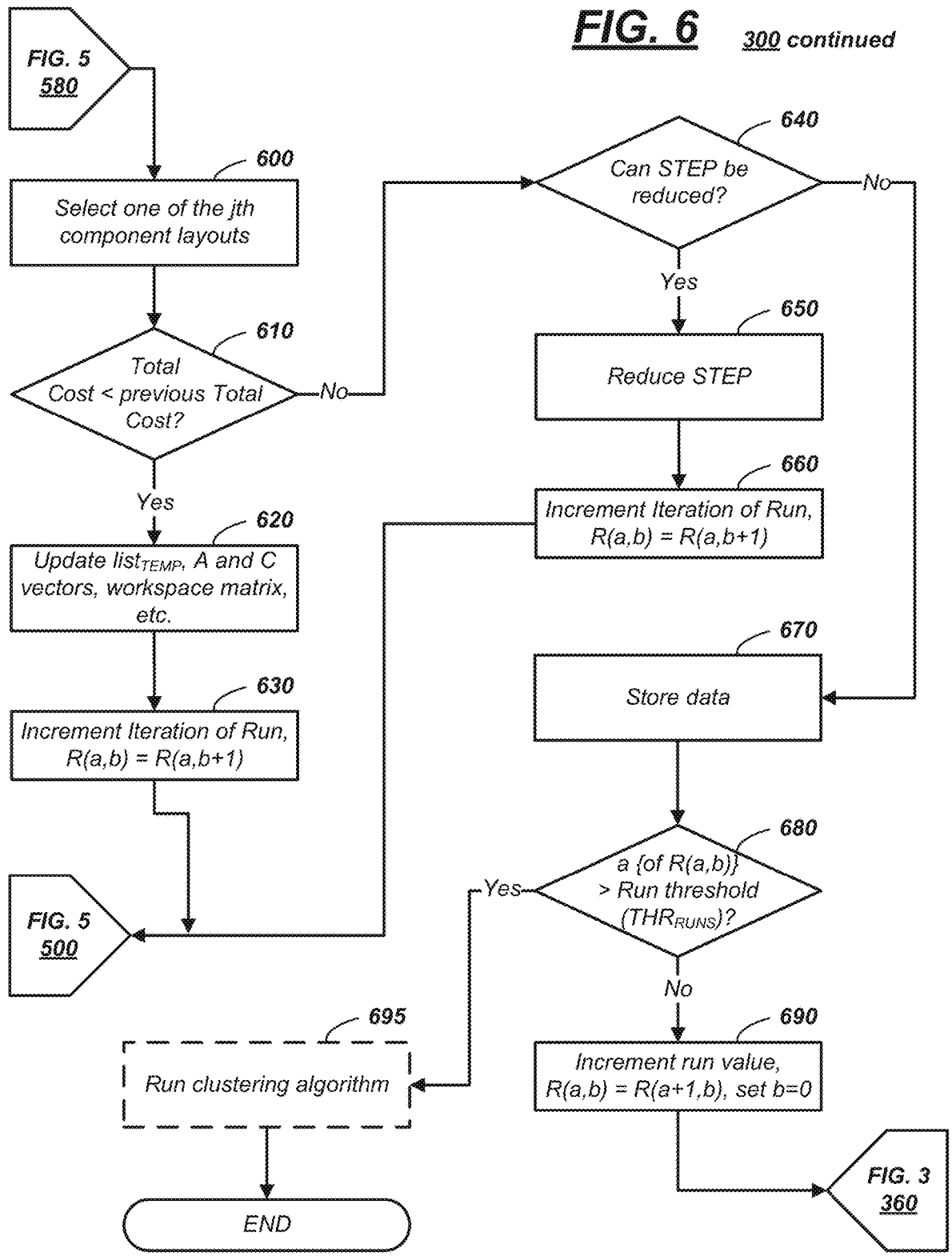

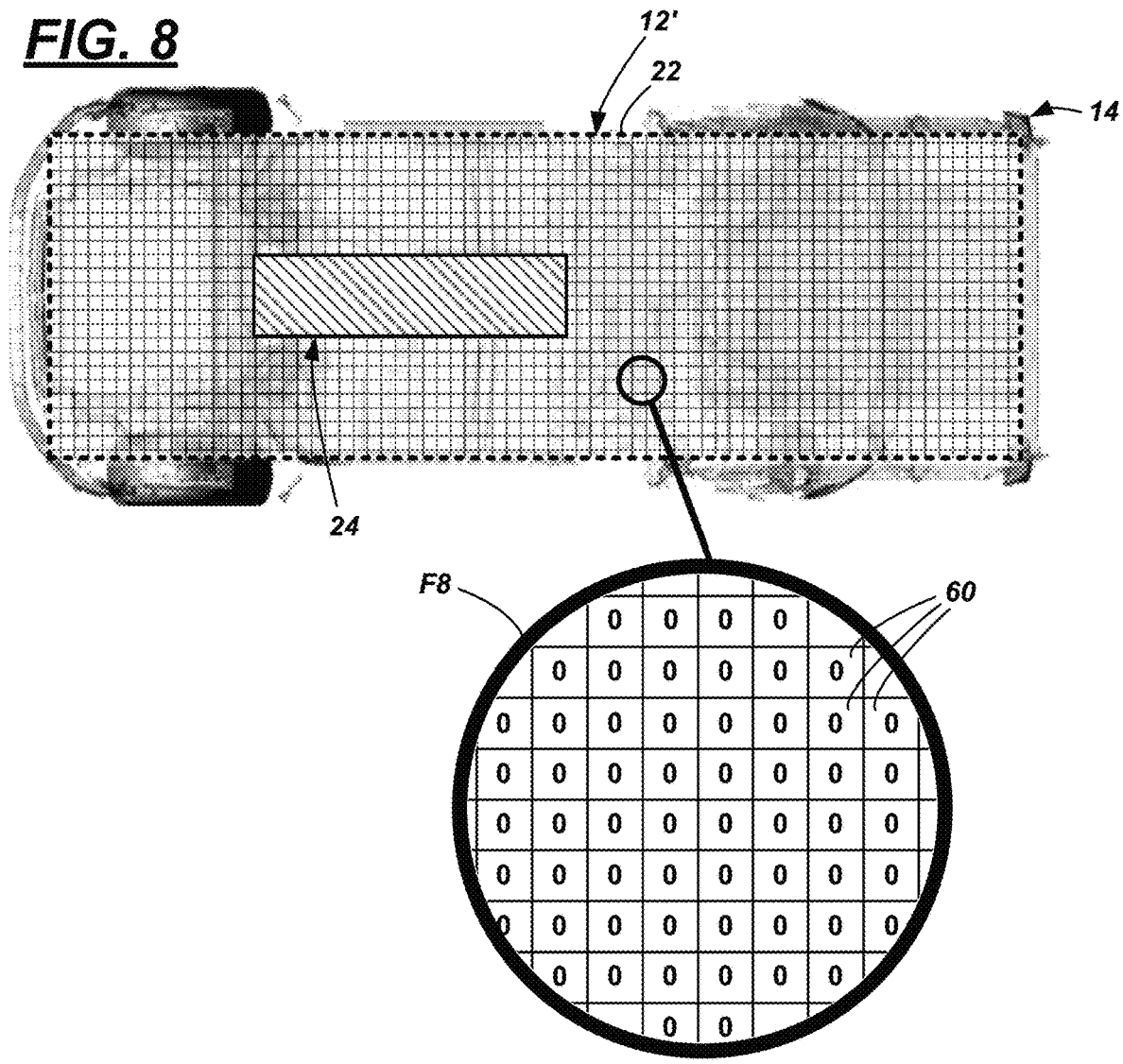

COMPONENT LAYOUT OPTIMIZATION

BACKGROUND

Engineering expend numerous resources both in a computer-aided environment, as well as in physical mock-ups attempting to arrange vehicle components in a suitable manner.

BRIEF DESCRIPTION OF THE DRAWINGS

FIGS. 3-6 illustrate an example process for optimizing a layout of vehicle components.

FIG. 7 is another example of a vehicle workspace.

FIG. 8 is a schematic view a vehicle workspace matrix.

DETAILED DESCRIPTION

Figure 1:
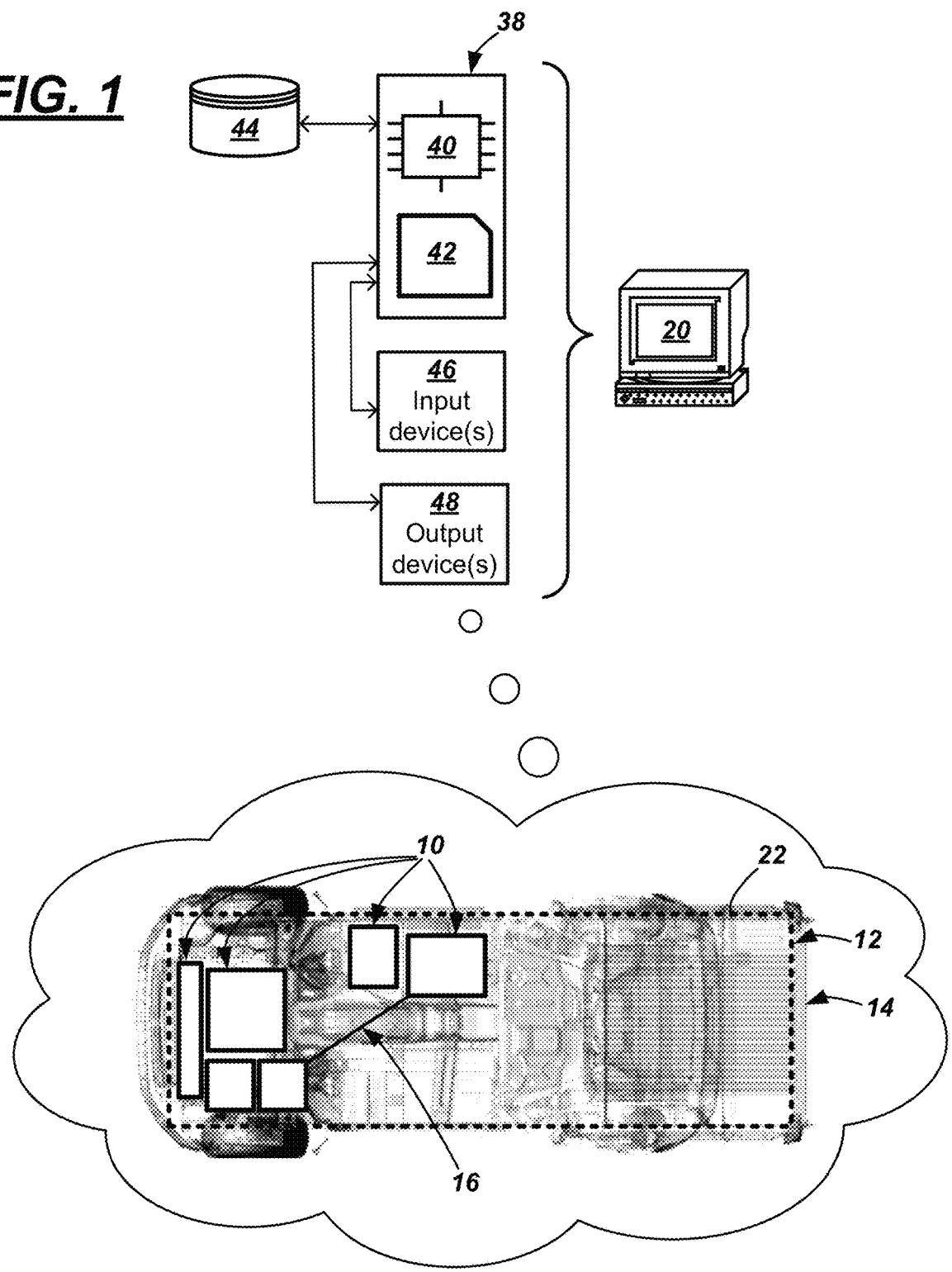
FIG. 1 is a schematic diagram illustrating a system for optimally arranging vehicle components within a vehicle workspace.

A system and a method are described for laying out components in a vehicle workspace. The method may comprise: receiving, as input, a plurality of components for a vehicle workspace; determining an optimization of a routing of a plurality of connections, each of which connect to at least one of the plurality of components; and providing an output indicative of the routing within the vehicle workspace.

According to the at least one example set forth above, each of the plurality of components are associated with dimensions and clearance data.

According to the at least one example set forth above, the dimensions are two-dimensional or three-dimensional.

According to the at least one example set forth above, the input further comprises: at least one of a keep-out (KO) zone or component-specific (CS)-zone data.

According to the at least one example set forth above, receiving as input comprises at least one of: receiving the input from a user, receiving the from a computer memory, or receiving the from a computer database.

According to the at least one example set forth above, the workspace is mathematically represented as a workspace matrix comprising segments having values of zero (0) or one (1), wherein, when one of the plurality of components occupy one of the segments, the respective segment's value is assigned to one (1).

According to the at least one example set forth above, further comprising: randomly positioning the plurality of components into the vehicle workspace.

According to the at least one example set forth above, further comprising: storing, for each of the plurality of components, at least one vector.

According to the at least one example set forth above, the at least one vector is: a component position vector representative of a first reference point (on a respective component) that is relative to an origin of the vehicle workspace or a feature position vector representative of a second reference point (on a connector of the respective component) that is relative to the origin of the vehicle workspace.

According to the at least one example set forth above, further comprising: iteratively moving at least some of the plurality of components within the vehicle workspace.

According to the at least one example set forth above, iteratively moving further comprises at least one displacement or at least one rotation.

According to the at least one example set forth above, iteratively moving at least some of the plurality of components occurs via a step size.

According to the at least one example set forth above, iteratively moving at least some of the plurality of components over a plurality of runs, wherein the step size decreases over at least some of the plurality of runs.

According to the at least one example set forth above, determining the optimization further comprises using a pathfinding algorithm.

According to the at least one example set forth above, determining the optimization further comprises determining a total cost associated with a first component layout within the workspace and comparing it with a total cost of a second component layout within the workspace, wherein the second component layout includes a movement of at least one of the plurality of components relative to the first component layout.

According to the at least one example set forth above, determining the optimization further comprises using at least one cost factor.

According to the at least one example set forth above, the at least one cost factor is associated with: a cost of the plurality of connections, a weight of the plurality of connections, a corrosion of at least one of the plurality of connections, a thermal-shield of at least one of the plurality of connections, a supplier sourcing of at least one of the plurality of connections, an assembly of at least one of the plurality of connections, a repair of at least one of the plurality of connections, a crash of at least one of the plurality of connections, or a governmental regulation of at least one of the plurality of connections.

According to the at least one example set forth above, determining the optimization further comprises applying a shrinking factor to the vehicle workspace.

According to another illustrative example, a system is described that comprises: a processor; and memory storing instructions executable by the processor, the instructions comprising, to: receive, as input, a plurality of components for a vehicle workspace; determine an optimization of a routing of a plurality of connections, each of which connect to at least one of the plurality of components; and provide an output indicative of the routing within the vehicle workspace.

According to the at least one example set forth above, the instructions further comprise, to: iteratively move at least some of the plurality of components within the vehicle workspace.

According to the at least one example, a computer is disclosed that is programmed to execute any combination of the examples set forth above.

According to the at least one example, a computer is disclosed that is programmed to execute any combination of the examples of the method(s) set forth above.

According to the at least one example, a computer program product is disclosed that includes a computer readable medium storing instructions executable by a computer processor, wherein the instructions include any combination of the instruction examples set forth above.

According to the at least one example, a computer program product is disclosed that includes a computer readable medium that stores instructions executable by a computer processor, wherein the instructions include any combination of the examples of the method(s) set forth above.

Turning now to the figures, wherein like reference numerals indicate similar or like features or functions, a computer-implemented process is described for optimizing a layout of vehicle components on a vehicle workspace (also referred to as a virtual vehicle platform) 12. Throughout this disclosure, a vehicle 14 refers to a virtual representation of a vehicle. Throughout this disclosure, a vehicle component 10 means a virtual representation of a vehicle hardware component—and further, vehicle component 10 may be defined by data storable in computer memory, wherein the data includes information regarding the component's features (size, connector locations, etc.), clearance requirements (e.g., with respect to other components), keep-out (KO) zones within the workspace 12, and the like. Also, throughout this disclosure, a vehicle workspace 12 means a virtual representation of a body and/or frame of vehicle 14 that provides space for the vehicle components 10 to be wholly positioned and/or oriented while concurrently providing space for one or more connections to those components (10). Workspace 12 may include features such as a virtual representation of the vehicle's powertrain, vehicle wheels, etc., as well as KO zones and other clearances. According to an example, the process may be used by engineers as part of a component layout procedure which includes accounting for one or more cost factors (e.g., such as the price of electrical and fluid connections and weights of the same). As used herein, a connection 16 is a virtual representation of: (a) a routing of any line, conduit, hose, pipe, or the like used to mechanically communicate fluid between a vehicle component 10 and another device (e.g., which may or may not be a different component 10), or (b) a routing of any line, cable, harness, or the like used to electrically communicate power or data between a vehicle component 10 and another device (e.g., which may or may not be a different component 10). In general, the component layout procedure described below seeks to optimize the layout of these components 10 so that the length and weight of the connections 16 are globally minimized (i.e., accounting for a variety of costs and weights of various connections 16); thus, optimization may refer to a most-direct (or most-nearly-direct) routing of connections 16. As will be apparent from the disclosure below, while the connections 16 represent physical hardware, these connections 16 may not be routed in the physical world precisely in the manner that a computer 20 may determine their minimization (or otherwise represent their routing on a display or monitor); instead rather, the routing of connections 16 by a computer may be representative of a relative optimization (and be useful for purposes of comparison with layouts of differently-arranged components 10).

In the present context of this disclosure, the term optimization means within a threshold (e.g., 5%) of optimal (i.e., an absolute minimum of connections 16 is not required for the component layout to be considered 'optimized'). As will be apparent from the description below, this threshold can conserve computing resources (e.g., by getting the component close to optimal, while still permitting room for engineering judgment to make minor tweaks in the layout of actual component hardware).

The process(es) described herein may be embodied as a set of software instructions executable by the computer 20. Thus, as described more below, the computer 20 may determine an optimization by iteratively moving components 10 on workspace 12 and, for each iteration, using a pathfinding algorithm to determine one or more desirable component layouts, wherein each of the determined component layouts have attempted to minimize the desired and preselected cost factor(s). Examples of the process will be described following a more detailed description of the vehicle 14, the components 10, the workspace 12, etc. and also computer 20.

In FIG. 1, vehicle 14 is illustrated as a truck; however, this is merely an example. Vehicle 14 also could be a passenger vehicle, a sports utility vehicle (SUV), a recreational vehicle, a bus, an aircraft, a marine vessel, or the like. In at least one example, an automotive vehicle is contemplated. Accordingly, the vehicle workspace 12 may be a virtual representation of at least a portion of a conceptual or actual physical body and/or frame of a vehicle. By way of example, the workspace 12 (and also the component(s) 10 and connections 16) are illustrated in a two-dimensional (2D) format. Accordingly, the process(es) that are described by way of example below pertain to a 2D perspective, wherein the arrangement of components 10 is a 2D projection onto the workspace 12. In other examples, each of the components 10 and workspace 12 may be embodied as three-dimensional (e.g., implemented in a three-dimensional (3D) format).

Workspace 12 may be defined by a peripheral boundary 22. The illustrated shape of boundary 22 (in FIG. 1) is rectangular; however, this is merely an example; other shapes (having more or fewer sides) are contemplated as well. Further, while not shown here, inscribed regions within the boundary 22 may be defined—e.g., thereby designating them as not part of workspace 12.

Figure 2:
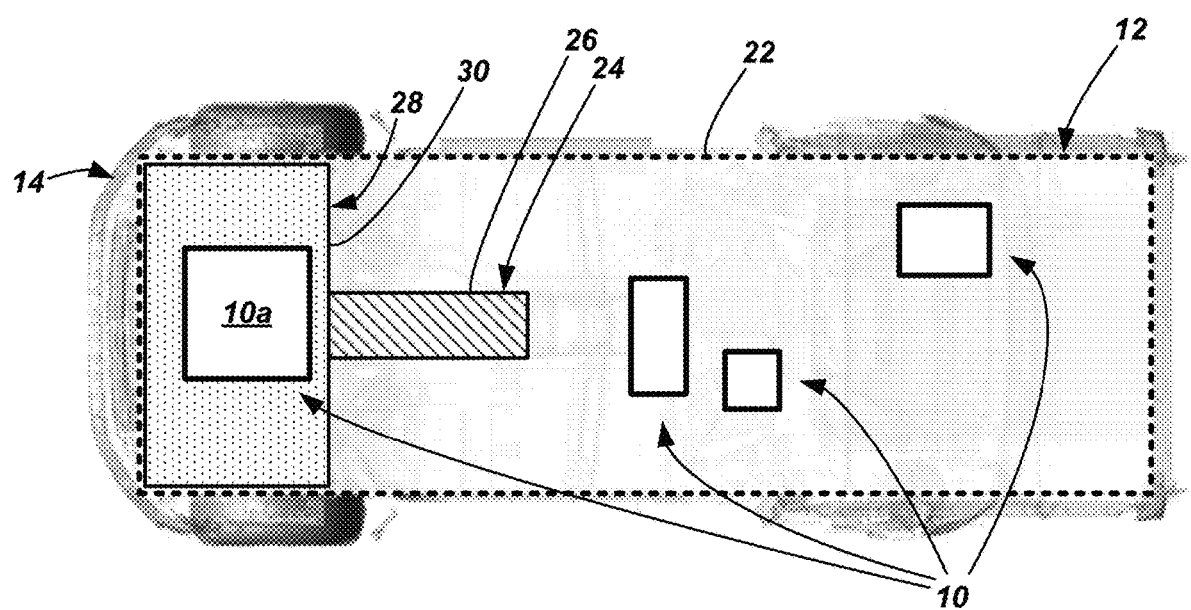
FIG. 2 is an example of a vehicle workspace.

Within the workspace shown in FIG. 2, one or more regions may be designated as a keep-out (KO) zone 24 (defined by a circumferential boundary 26) and/or a component-specific (CS) zone 28 (defined by a circumferential boundary 30). As used herein, a keep-out (KO) zone 24 means a region within the vehicle workspace 12 in which the computer 20 is instructed to not position any of the plurality of components 10. And as used herein, a component-specific (CS) zone 28 means a region within the vehicle workspace 12 in which a particular component 10 must be located. For example, in FIG. 2, one of the illustrated components (component 10a) may be required to be within CS zone 28—and component 10a, as well as the other components 10, may be required to not be positioned within KO zone 24 or even partially outside of boundary 22.

Components 10 shown in FIGS. 1-2 may be virtual representations of line-replaceable units (LRUs—e.g., a modular component designed to be swappable with other similarly configured devices), shop-replaceable units (SRUs—e.g., a modular component designed to be replaced by a trained technician), or any integrated mechanical, electrical, or electro-mechanical device. Non-limiting examples of components 10 include: a low voltage (LV)

battery, a high voltage (HV) battery, a power distribution board (PDB), a direct-current (DC) to DC converter (DC-DC), a low temperature radiator (LTR), a coolant pump, a body control module (BCM), and an idle speed control (ISC), just to name a few.

According to one example, each component 10 is associated with a data file defining component features. Each data file may comprise one or more of the following features: a unique identifier (e.g., a name of the component, an alphanumeric value, etc.); dimensions of a body of the component 10 (e.g., at least a length (l) and width (w) for 2D embodiments; e.g., at least a length (l), a width (w), and a height (h) for 3D embodiments); a mask (also called a spatial footprint) of the body (a shape of a 2D projection or a 3D envelope that defines the component's shape); one or more connectors typically on an exterior surface of the body of the component 10 (for receiving a respective mechanical or electrical connection 16); a connector type (e.g., indicating the nature of the connection 16 which should be coupled thereto—e.g., any suitable electrical or mechanical connector and/or connection characteristics); clearance data with respect to other components 10 and any of boundaries 22, 26, 30; a modified mask (also called a modified spatial footprint) that includes spacing defined by the clearance data (e.g., a shape of the 2D projection plus spacing at least partially therearound, or shape of the 3D envelope plus spacing at least partially therearound); a modified mask reference point P (i.e., a point of reference on the modified mask, as described more below) to identify a position of the component 10 relative to a workspace frame of reference (also described below); at least one connector reference point (e.g., Q) (e.g., as described more below, so that the component's connector(s) may be identified within the workspace frame of reference); a static vector $\vec{B}$ extending from reference point P to connector reference point Q (e.g., where multiple connectors exist on the respective component (e.g., Q1, Q2, etc.), there may be multiple static vectors $\vec{B1}$, $\vec{B2}$, etc. as well); move-ability data (i.e., whether—during optimization—the computer 20 may move the component 10—e.g., translate and/or rotate it); rotate-ability data (i.e., whether—during optimization—the computer 20 may rotate the component 10—e.g., in 90 degree (°) increments or the like); and CS-zone data for the component 10 (i.e., whether the component 10 is assigned to a CS zone 28). While components 10 shown in FIGS. 1-2 are shown as rectangular (2D) or as having a rectangular volume (3D); this is not required. For example, one or more of components 10 may have non-rectangular shapes (e.g., including sides or 2D projections comprising curves and/or more or less than four sides). And as used herein, clearance data refers to a predefined spacing around the body of the respective component (e.g., the spacing may be defined by measurements stored in the data file). The predefined spacing (e.g., a gap) may be between an outer surface of the body of the component 10 and other components 10 (and/or the boundaries 22, 26, 30). Such spacing may be used to accommodate thermal requirements of the components 10 (e.g., component cooling), routing of connections 16 between components 10 and/or other vehicle structure, vibration and/or flexure profiles of structures carrying the components 10 or the components themselves, moving parts on the components 10, or the like.

Returning to FIG. 1, computer 20 may be a server, a desktop station, a laptop computer, or the like. Computer 20 may comprise a computational/logic unit 38 comprising one or more processors 40 and memory 42. In at least one example, each processor 40 may be identical; therefore, only one will be described. Processor 40 may be any type of device capable of processing electronic instructions, non-limiting examples including a microprocessor, a microcontroller or controller, an application specific integrated circuit (ASIC), etc.—just to name a few. In general, processor 40 may be programmed to execute digitally-stored instructions, which may be stored in memory 42, which enable the computer 20 to determine a layout of a plurality of components 10. Non-limiting examples of instructions will be described in the one or more processes described below, wherein the order of the instructions set forth below is merely an example.

Memory 42 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 42 may store one or more computer program products which may be embodied as software, firmware, or other programming instructions executable by the processor 40. In addition, memory 42 may store the data files associated with each of the components 10, as described above.

Computer 20 also may comprise or be communicatively connected to one or more databases 44 (also referred to as data repositories and data stores). Database(s) 44 may include various kinds of mechanisms for storing, accessing, and retrieving various kinds of data, including a hierarchical database, a set of files in a file system, an application database in a proprietary format, a relational database management system (RDBMS), etc. Each database 44 is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above. In the present context, database(s) 44 may store information pertaining to a number of vehicle workspaces 12 (e.g., that correspond with different vehicle variants), a number of component specifications and constraints (e.g., different types of components, sizes and/or spatial footprints of components, type(s) of connections 16, a location of connectors on the component, and the like). Thus, according to at least one example, computer 20 may receive information as 'input' from database 44, as described more below.

Computer 20 further may comprise one or more computer input devices 46 and/or one or more computer output devices 48. Input device(s) 46 comprise any suitable device for providing data to processor(s) 40. Non-limiting examples include the database(s) 44 (described above), memory 42, a keyboard for user-input, a touchscreen for user input, a microphone, a mouse, other hand-operated controllers, and the like.

Output device(s) 48 comprise any suitable device for presenting and/or receiving output from the processor(s) 40. Non-limiting examples of output devices 48 include a computer display, a printer, a projector, memory 42, database 44, or any other device adapted to receive data from computer 20.

Turning now to FIGS. 3-6, a flow diagram illustrates a process 300 of optimizing a component layout in the vehicle workspace 12. As described, this process 300 employs a two-dimensional model; however, as discussed above, in other examples, process 300 may operate using a three-dimensional model instead. For example, in a 3D implementation, the vehicle workspace 12 may comprise a 3D region defined by a 3D boundary (rather than a 2D region defined by boundary 22) and each of the data files for the components 10 may comprise 3D dimensions (l, w, h), a 3D mask (rather than a 2D mask), a 3D modified mask (rather than a 2D modified mask), 3D (rather than 2D) move-ability data, 3D (rather than 2D) rotate-ability data, etc.

In general, process 300 may comprise a plurality of instructions (shown as blocks) which may be stored in memory 42 and executable by processor 40. At least some of the instructions set forth below may be executed in a different order, and/or one or more of the instructions set forth below may be optional. Process 300 may begin with an initialization instruction 310. In the illustration (FIG. 3), this block includes blocks 320-380.

In block 320, computer 20 may receive, as input, a vehicle workspace 12 for a desired vehicle 14 (see also FIG. 7). The computer 20 may receive the workspace 12 via input device(s) 46 (e.g., by a user entering data via a keyboard or mouse, by uploading a stored profile from database 44, or the like). According to at least one example, computer 20 receives a previously-configured workspace 12 from database 44, wherein database 44 may store unique workspaces for multiple configurations of the same vehicle 14 and/or one or more workspaces for multiple different vehicles 14. In at least one example, a user may enter a unique identifier (associated with the specific vehicle 14 and/or the workspace 12), computer 20 may retrieve the workspace 12 from database 44, and computer 20 may load the workspace 12 into memory 42—e.g., to initiate the component layout optimization.

In at least some examples, the vehicle workspace 12 may comprise one or more keep-out (KO) zones 24 (see also FIG. 7). However, this is not required. Further, in at least one example, the user may define KO zones 24 via input device 46, and these may be added to the workspace 12.

In block 330 which follows, computer 14 may generate a segmented vehicle workspace 12'—e.g., a binary representation of the vehicle workspace 12 (see also FIG. 8). As used herein, a segmented workspace refers to a segmentation of a vehicle workspace 12 into a plurality of a grid-like segments 60, wherein each segment 60 is assigned a binary value (e.g., a zero (0) or a one (1)). Note: in the current 2D implementation, all segments 60 may be two-dimensional and may reside in the same plane; however, in 3D implementations, the segments may be three-dimensional (e.g., cubic), and the corresponding vehicle workspace 12' may be comprised of multiple layers of such cubic segments. As illustrated, in at least one example, the segments 60 are of equal size. For purposes of an example herein, the segmented workspace matrix may have an illustrative size of 4500 segments×2000 segments.

Mathematically, the segmented vehicle workspace 12' may be represented (and stored in memory 42) as a workspace matrix (of zeros and ones) (e.g., continuing with the example above, 4500×2000=20,000 zeros and ones). Block 330 further may comprise initializing the segmented workspace 12'—i.e., setting all segment values of the matrix to zero. FIG. 8 illustrates an enlarged portion F8 of workspace 12' intended to schematically illustrate this initialization. Segmentation of the KO zone(s) 24 is not be required.

Figure 9:
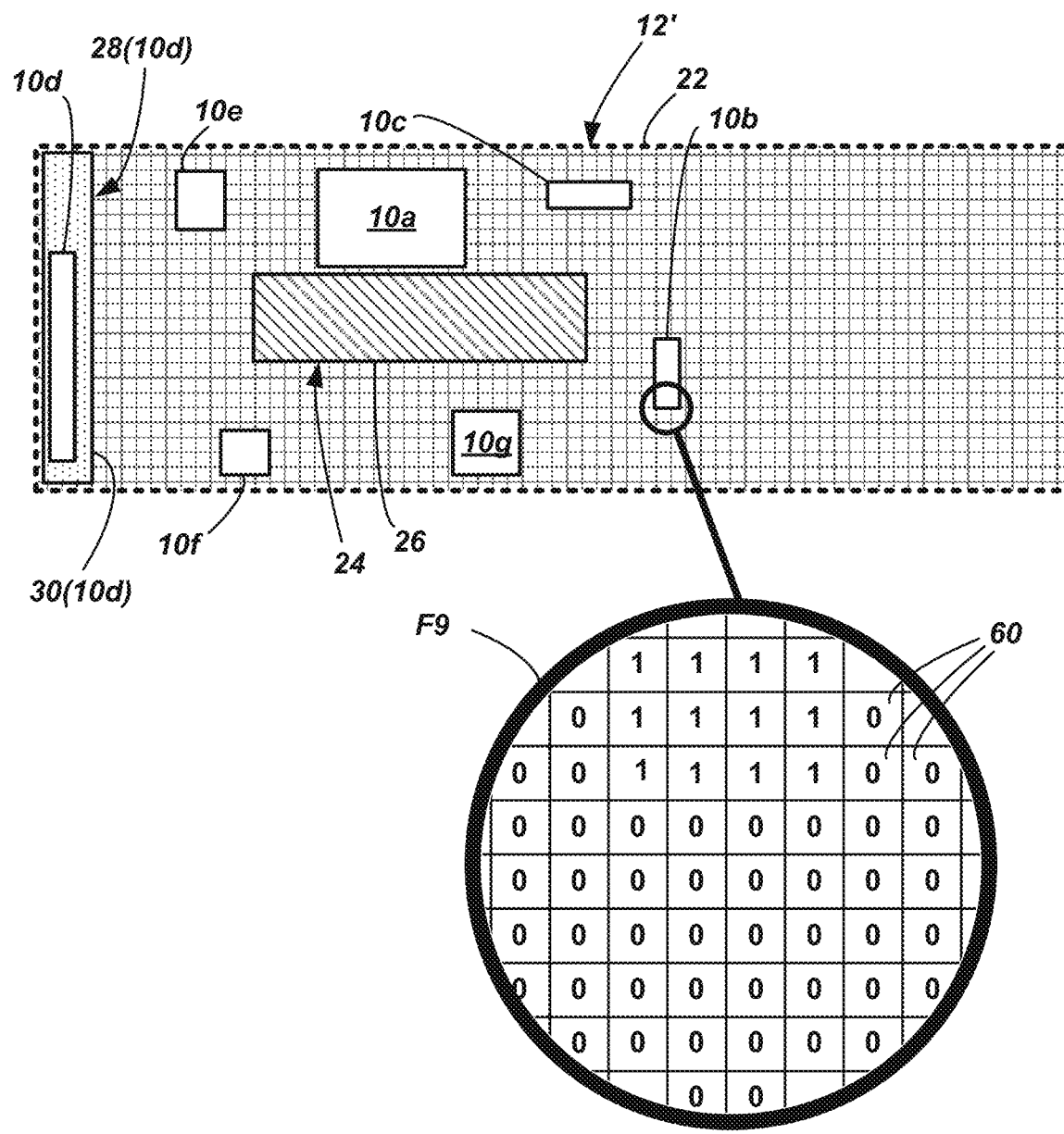
FIG. 9 is another schematic view an updated vehicle workspace matrix.

In block 340, which may follow block 330, computer 20 may receive as input a selected set of components 10 (e.g., as illustrated in FIG. 9, wherein the vehicle 14 is hidden from view for clarity: components 10a, 10b, 10c, 10d, 10e, 10f, 10g). These components 10 may be selected by the user (e.g., a vehicle engineer) via input device 46 or may be selected by computer 20 and/or some other computing device. Block 340 may comprise—for each of the selected components 10—computer 20 uploading the component's respective data file (from database 44) into memory 42. In at least one example (that may be used alternately or in combination with the examples above), the user may create a data file for any new component—which in turn may be selected and/or stored in database 44. Adding new files may be particularly useful when a vehicle engineering team desires to determine a layout incorporating a new component with previously-existing components. Of course, this is merely an example use-case; and other use-case examples exist.

It should be appreciated that—in the present context—the 'selected components' refer to components 10 which are movable within the vehicle workspace 12' (e.g., in accordance with their move-ability data). As described below, these selected components will be randomly located into the workspace 12'. That said, in block 340, the computer 20 (or a user via the computer 20) may locate and/or orient other components into the workspace 12' which are not moveable (e.g., fixed components); however, herein these are not referred to as 'selected components.' For example, as described below, such fixed components may be used in the evaluation of routing connections 16 and the like (e.g., as connections 16 may be routed to and/or around the fixed components). Thus the 'selected components,' as used herein, refer to those which may be moved to achieve optimization.

In block 350 which follows, computer 20 may determine a largest modified mask ($mask_{MAX}$) among the selected components 10, an initial step size ($STEP_0$), a threshold quantity of runs ($THR_{RUNS}$) of process 300, and a shrinking factor (S) of the workspace matrix and step size. Determining these criteria may include the computer 20 performing mathematical computations and/or comparisons, the user entering information via input device 46, computer 20 retrieving data from database 44, or a combination thereof. Each of the largest modified mask, the initial step size, the threshold quantity of runs, and the shrinking factor will be discussed in turn.

Determining the largest modified mask ($mask_{MAX}$) may comprise computer 20 comparing the modified masks (in the respective data files) of each of the selected components (e.g., 10a-10g) to determine which is the largest. Continuing with the 2D example, computer 20 may calculate an area of each of the modified masks (for components 10a-10g) and compare them to one another to determine which is the largest.

As will be described in the process below, in order to determine an optimization of the component layout, each of the components 10a-10g will be displaced incrementally to, among other things, minimize the lengths of their respective connections 16 therebetween. Thus, as used herein, a step size (STEP) refers to a unit measure of this incremental displacement. For instance, continuing with the example above, if a pre-processing step size ($STEP_{PRE}$) equals 200, then each incremental displacement on the segmented workspace (of 4500×2000) would be 200 segments at a time. Determining the pre-processing step size ($STEP_{PRE}$) may comprise receiving input from a user (via device 46), retrieving the pre-processing step size ($STEP_{PRE}$) from memory 42 and/or database 44, or the like. As will be explained below, the pre-processing step size ($STEP_{PRE}$) may be reduced to an initial step size ($STEP_0$) by the shrinking factor (S) to improve computational time. Further, as part of the optimization, the initial step size ($STEP_0$) also may be reduced during a run. Accordingly, the initial step size ($STEP_0$) refers to the step size of a first iteration of a run.

As used herein, a run refers to a set of computer-implemented instructions that evaluate a series of potential displacements and/or rotations of each of the selected components (e.g., 10a-10g), wherein each potential displacement or rotation is an iteration of that run, wherein the run further comprises calculating a total cost for each iteration. The threshold quantity of runs ($THR_{RUNS}$) may be determined similarly to determining the initial step size—e.g., this may comprise receiving input from a user (via device 46), retrieving the threshold quantity of runs ($THR_{RUNS}$) from memory 42 and/or database 44, or the like. It should be appreciated that the threshold quantity of runs ($THR_{RUNS}$) may be determined based on balancing computational efficiency with optimization. For example, if too few runs are used in process 300, then the layout of the components 10 may not move sufficiently for optimization (and be substantially less than optimal), whereas if too many runs are used in the process, then computing resources may be wasted as unneeded runs may yield negligible differences in component layout optimization.

Shrinking factor (S) may be a numerical value used to increase the computational efficiency of the computer 20 by altering a segmentation scale of the segmented workspace (and corresponding workspace matrix) and altering the step size. For instance, continuing with the example above, if the shrinking factor (S) is 0.02 the scale of the segmented workspace changes to 90×40 (e.g., 0.02*4500× 0.02*2000=90×40) and the pre-processing step size ($STEP_{PRE}$) becomes 4 (e.g., 0.02*200=4; thus, in this example, initial step size ($STEP_0$)=4). The value of the shrinking factor (S) may be determined by receiving input from a user (via device 46), by retrieving the shrinking factor (S) from memory 42 and/or database 44, or the like. It should be appreciated that the multiplier of "0.02" is merely an example; other examples also exist.

Figure 3:
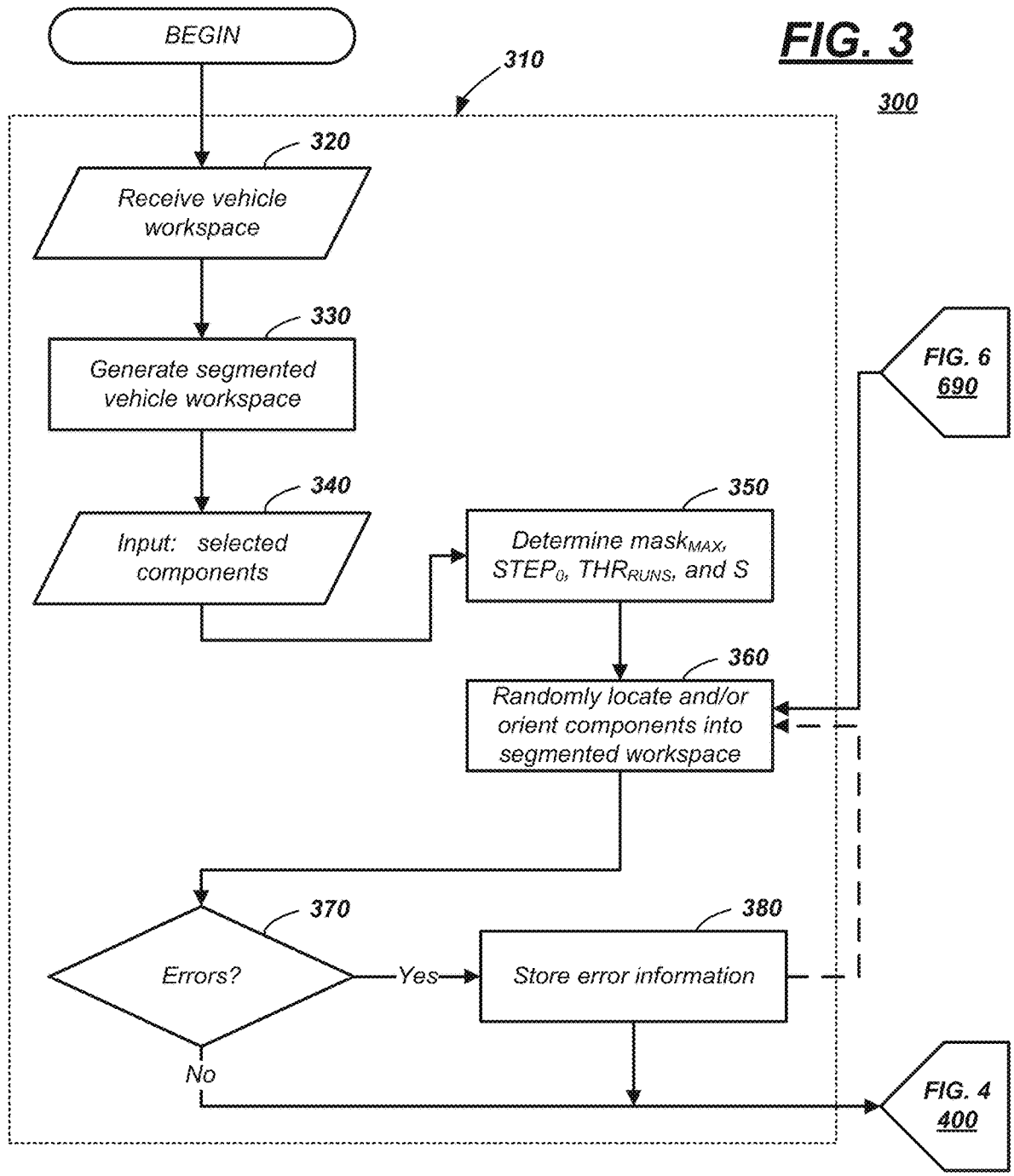

Block 360 of FIG. 3 may follow block 350. In block 360, computer 20 may initiate a first iteration (b) of a first run (a) (e.g., R(a,b)=0, 0) by randomly positioning and/or orienting each of the selected components (of block 340; 10a-10g) into the scaled and segmented workspace 12' (see e.g., FIG. 9). In the example, the modified masks of each of components 10a-10g are randomly positioned and/or oriented within segmented workspace 12' such that no portion of modified masks extend outside of the boundary 22, within the KO zone 24, or overlap each other. In addition, random positioning and/or orientation of the components 10a-10g may conform with the scale described above (e.g., snapped to a segmented workspace 12' of 90×40). Further, at least one of the components (e.g., 10d)—according to its respective data file—may need to be positioned within a CS zone (e.g., CS zone 28(10d)). Thus, with respect to at least component 10d, computer 20 randomly positions and/or orients component 10d within CS zone 28(10d) (accordingly, within boundary 30(10d)).

Enlarged region F9 (of FIG. 9) illustrates that where the modified mask for one of the components (e.g., in this case, component 10b) occupies segments 60 of the workspace 12', the respective segments are represented as a one ('1') instead of a zero ('0'). Thus, block 360 may comprise updating the workspace matrix as well so that any space occupied by a modified mask of a component is represented by '1s' and any unoccupied spaces remain a '0.'

Block 370 which follows block 360 may comprise an error checking instruction executable by computer 20. For example, computer 20 may perform one or more validations regarding the randomized placement of the components 10a-10g to determine that no modified mask of a component overlaps: with any portion of a modified mask of another component, with boundary 22, with boundary 26, or with a boundary of a CS zone (e.g., such as 30(10d)). According to one example, computer 20 may validate that no two components occupy a single segment 60 of the workspace matrix. If an error is detected, process 300 may proceed to block 380. If no error is detected, then the process may proceed to block 400 (FIG. 4).

In block 380, the computer 20 may store information identifying the error (e.g., including within which run and iteration (e.g., R(a,b)=R(0,0)) the error occurred). Error detection information may be used later when developing patches or updated versions of the software instructions. In some examples (not shown), process 300 may loop back and repeat block 360 (e.g., until no errors occur).

Figure 4:
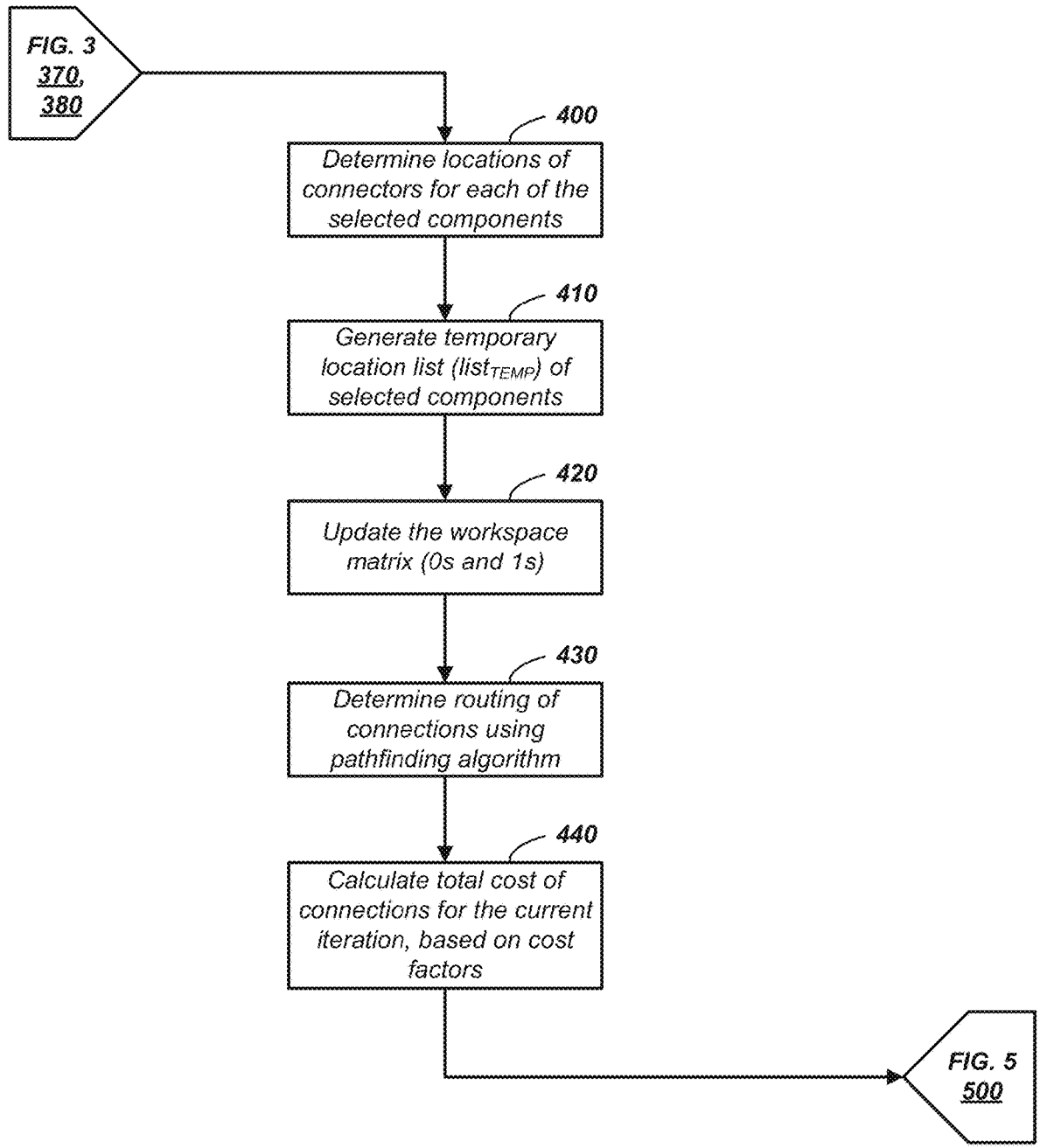

Block 400 is shown in FIG. 4. In block 400, computer 20 may determine a location of each connector on each of components 10a-10g. In at least one example, block 400 may be identically executed for each component 10a-10g; therefore, block 400 will be described only once (e.g., using component 10a as an example).

Figure 10:
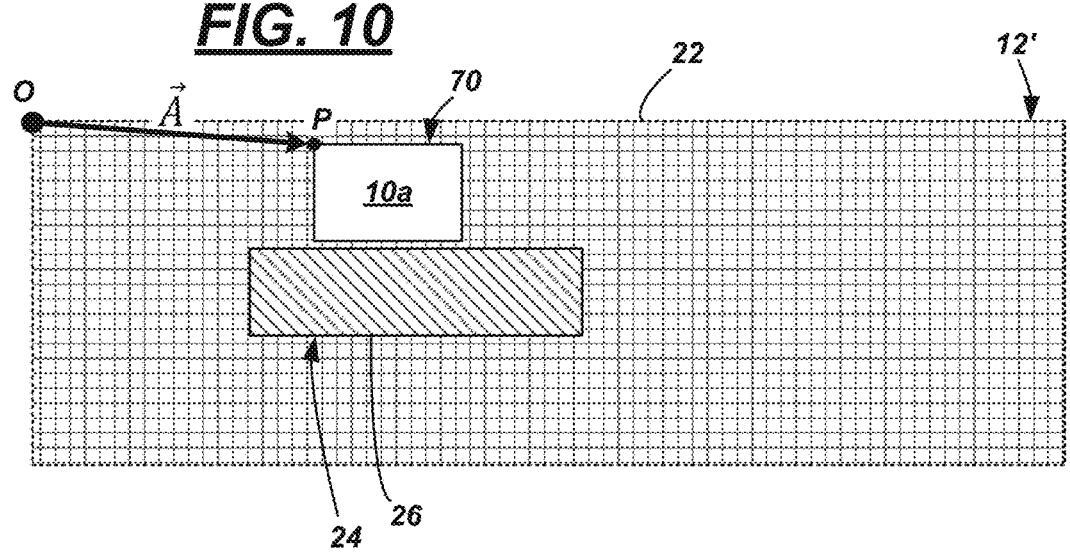
FIG. 10 is a schematic view of a vehicle workspace having a frame of reference and a component positioned relative to the frame of reference according to a first vector.
Figure 11:
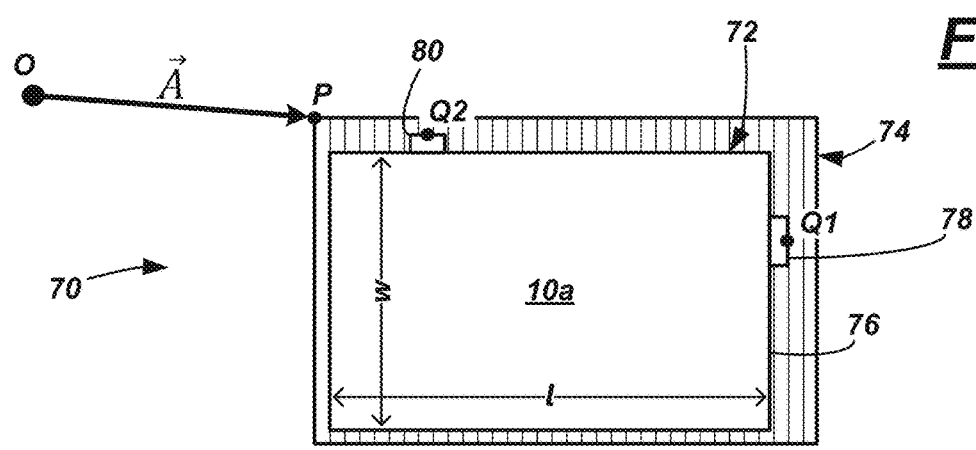
FIG. 11 illustrates a more detailed view of a portion of FIG. 10, wherein the workspace is hidden from view.
Figure 12:
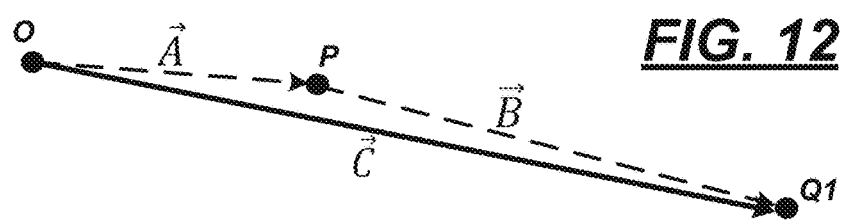
FIG. 12 illustrates the first vector (of FIG. 10), as well as a second vector and a third vector.

FIGS. 10-12 schematically illustrate one example of executing block 400 (e.g., many elements being hidden from view for clarity's sake only). More particularly, FIG. 10 illustrates that segmented workspace 12' may have a predetermined origin O (e.g., a global reference point for the matrix of workspace 12'), and a component position vector $\vec{A}$ may extend from the origin O to a predetermined reference point P on a modified mask 70 of component 10a.

FIG. 11 is a schematic view of the modified mask 70 of component 10a—the modified mask 70 comprising a mask 72 (of component 10a, e.g., defined by dimensions l and w) and a spacing 74 (in this instance) circumferentially extending around the mask 72 (the spacing 74 defined by component 10a's clearance data in its respective data file). In the current example, the mask 72 comprises not only an outline of a body 76 of the component 10a, but also an outline of a connector 78. In this example, component 10a is shown having a second connector 80 as well; however, this is not required. Typically, the spacing 74 provides sufficient clearance for any connectors 78, 80 (and may also be associated with the thermal properties of the respective component, tolerances, etc.). As used herein, a connector is an electrical or mechanical connector that is configured to mate to a connection 16, which is defined above. FIG. 11 illustrates that each connector 78, 80 may comprise a respective predetermined connector reference point (e.g., Q1, Q2, respectively).

FIG. 12 illustrates a component position vector $\vec{A}$, a static vector $\vec{B}$ (associated with the particular component 10a), and a feature position vector $\vec{C}$ and further illustrates how computer 20 may determine both an orientation of the component 10a, as well as a relative position of connector 78 (note: while not illustrated here, this may be repeated for connector 80 and/or other features as well). Vector $\vec{A}$ was described above. Vector $\vec{B}$ may extend from point P to a point Q1 (a feature of the component 10a) (e.g., a connector). And feature position vector $\vec{C}$ identifies a vector that extends from the origin O to point Q1. More particularly, FIG. 12 illustrates that vector $\vec{C}$ may represent a vector quantity from point O to a point Q1, wherein the sum of vector $\vec{A}$ and vector $\vec{B}$ equal the vector $\vec{C}$ (i.e., $\vec{A}+\vec{B}=\vec{C}$). Thus, in block 400, computer 20 may determine a vector (such as vector $\vec{C}$) for each component and thereby determine a position of each connector for each component (10a-10g). Further, using point P and/or point Q1, computer 20 may determine an orientation of the respective component.

Returning to FIG. 4, in block 410 which follows, computer 20 may generate a temporary location list ($list_{TEMP}$) of the selected components 10a-10g. According to one example, the list ($list_{TEMP}$) comprises at least one feature position vector (e.g., $\vec{C}$) for each of components 10a-10g (e.g., indicating a position of the one or more connectors (e.g., 78, 80)) and/or a component position vector (e.g., $\vec{A}$) for each of components 10a-10g. [Note: in one example, the static vector (e.g., $\vec{B}$) of each component 10a-10g may be stored in each respective component's data file, as this value is a constant.]

In block 420 which follows, using the temporary location list ($list_{TEMP}$), computer 20 may update the workspace matrix. For example, the workspace matrix may be an indexed array, wherein each index comprises a binary value. For example, computer 20 may determine which segments 60 of the workspace matrix are occupied (and should be designated a '1') and which segments are unoccupied (and should be designed a '0').

Block 430 follows block 420. In block 430, computer 20 may determine a routing for a plurality of connections 16 between each of the components 10a-10g—e.g., according to the respective connector type. For example, if a component is a radiator, then connections 16 for the radiator may comprise a first hose and a second hose, wherein the connector types for the respective connectors are specified in the data file for the component (e.g., this includes make, model, size, etc.). Or for example, if a component is a body control module (BCM), then connections 16 for the BCM may comprise two different electrical connections 16—e.g., one for power (high voltage) and one for data (low voltage), wherein each connection 16 may connect to the BCM via a different connector and information regarding these connectors is stored in the respective BCM data file. (In other component examples, the connections may be mechanical connections—e.g., for enabling fluid communication; in some examples, a combination of electrical and mechanical connections are possible.)

With respect to the routing in block 430, computer 20 may utilize any suitable pathfinding algorithm for each of the plurality of connections 16. As used herein, a pathfinding algorithm refers to a set of computer-executable instructions that are capable of determining a shortest route between two points which further may comprise determining the shortest route by going around one or more objects or between two or more objects—e.g., a shortest route from a connector of one component to a connector of another—e.g., while navigating around boundaries (e.g., such as 22, 26, 30). A non-limiting example of such a pathfinding algorithm is an A* algorithm; however, other pathfinding algorithms may be used. As discussed above, optimization based on cost factor (s) may pertain to using the least lengths of connections 16 for the respective components. For example, two cost factors (money and weight) may be correspondingly higher or lower based on each unit of length (x) of each connection 16.

In block 440, the computer may determine a total cost for the current run iteration ($TC_{R(a,b),j}$) based on a current routing arrangement of the plurality of connections 16 to each of the selected components 10a-10g, as routed by the pathfinding algorithm in block 430. [Note 'TC' refers to total cost, 'R(a,b)' designates a particular run and respective iteration (e.g., 'a' is an index of the run and 'b' is an index of the iteration of the run), and 'j' is an index referring to the component layout and will be discussed more below.]

According to one non-limiting example, computer 20 may utilize Equation (1) and Equation (2) to make this determination. More particularly, Equation (1) is an example of how computer 20 may determine a cost for a single connection 16 (e.g., the $i^{th}$ connection), and Equation (2) may simply sum the $Cost_i(x)$ for all of the plurality of connections 16 in the current routing arrangement.

$$Cost_i(x) = x*(P_{cxn} + CW*WL) \quad \text{Equation (1)}$$

Wherein x is a unit length of the particular connection 16 (e.g., in millimeters), wherein $P_{cxn}$ is monetary value (e.g., cost) per unit length (e.g., USD/mm) of the respective connection 16, wherein CW is a cost per unit of weight (e.g., USD/kg) of the respective connection 16, and wherein WL is a weight per unit length (e.g., kg/mm) of the respective connection 16.

$$TC_{R,j} = \sum_i^l Cost_i(x) \quad \text{Equation (2)}$$

Wherein $TC_{R(a,b),j}$ is a total cost for the $b^{th}$ iteration of the $a^{th}$ run for the current component layout, wherein l is a total quantity of connections 16 (e.g., the largest $i^{th}$ value).

It should be appreciated that Equation (1) and the two illustrated cost factors (cost/unit length and cost per unit of weight) are merely examples. For example, Equation (3) below illustrates a number of additional cost factors that may be evaluated—e.g., namely, a corrosion cost factor (Corr) (a cost attributable to adding an environmental protection element to a component 10 based on its location in the vehicle), a thermal-shield cost factor (Thm) (a cost attributable to a need to add a thermal-shield to a component 10), a supplier sourcing cost factor (Supp) (a cost attributable to sourcing, volume, and commodity price impact of a component 10), an assembly cost factor (Asm) (a cost associated with an ease (or difficulty) and ergonomics of locating connections 16 relative to and around components 10 and/or other obstacles), a repair cost factor (Repr) (a cost associated with future service of a component 10 based on its positioning or orientation), a crash cost factor (Crsh) (a cost factor associated with a degree of safety improvement based on its location or orientation), a governmental regulatory cost factor (Reg) (a cost factor associated with emissions and/or other regulatory costs), and a component (10) and connection (16) weight distribution cost factor (Drb) (a cost factor associated with a distribution of vehicle weight— e.g., relative to fore/aft weight distribution, to port/starboard weight distribution, to a combination thereof, or the like) just to name a few non-limiting examples. In one example, any combination of the cost factors shown in Equation (3) may be used—e.g., with or without additional equivalent cost factors not listed here.

$$\text{Cost}_i(x) = x*(P_{cxn} + CW*WL) + w1*k1*\text{Corr} + w2*k2*\text{Thm} + w3*k3*\text{Supp} + w4*k4*\text{Asm} + w5*k5*\text{Repr} + w6*k6*\text{Crsh} + w7*k7*\text{Reg} + w8*k8*\text{Drb} \quad \text{Equation (3)}$$

Wherein w1, w2, w3, w4, w5, w6, w7, and w8 are predetermined weighting values which may be used to weigh some cost factors more heavily than others, wherein k1, k2, k3, k4, k5, k6, k7, and k8 are predetermined constants representing added cost with respect to the particular component layout. Thus, in at least one example, Equations (2) and (3) may be used together instead of Equations (1) and (2). Still further, of the illustrative cost factors shown in FIG. 3, in at least one example, any combination of cost factors may be used to determine $\text{Cost}_i(x)$ (e.g., fewer cost factors than those shown above, or in some cases, including additional cost factors (e.g., equivalents) which are not shown). Regardless of whether Equation (1), Equation (3), or some other equation is used, in block 440, a total cost for the component layout ($TC_{R(a,b),j}$) (e.g., $TC_{(0,0),0}$) is calculated.

Having determined an initial total cost value ($TC_{(0,0),0}$), as part of block 440, computer 20 may increment the iteration of the first run. E.g., continuing with the example, R may now equal one (R(a,b)=R(0,1)).

Following block 440 (FIG. 4), the process 300 may continue at block 500 (FIG. 5). In FIG. 5, a series of component displacements and rotations may occur. More particularly, as will be described below, each of the selected components 10a-10g may be translated in multiple directions and/or rotated incrementally to further optimize the component layout.

As described more below, according to one example, a component (e.g., in 2D model) may be displaced by one unit (defined by the step size) incrementally in a positive x-direction, a negative x-direction, a positive y-direction, then a negative y-direction and also may be rotated in 90° increments (through a full 360° rotation).

In FIG. 5, block 500 follows block 440 (from FIG. 4). In block 500, one of the components 10a-10g may be determined randomly (e.g., it is selected) by computer 20 for a number of evaluation iterations (for a present run R=1). As used herein, a run refers to computer 20 evaluating a potential movement of each of the selected components, wherein a movement of a component (or moving a component) refers to a displacement (e.g., also called translation) of the component or a rotation thereof. As used herein, an iteration refers to a sub-element of a run—namely, a potential movement of a component (e.g., computer 20 evaluating a single displacement or a single rotation). Thus, for any given component and for a single run, multiple iterations may exist.

Random determination of one of the selected components (for execution of blocks 500-580) purposefully may not give priority to movement (e.g., displacement or rotation) to any one of components 10a-10g, as will be apparent from the description below. According to one example, each of the components 10a-10g will be evaluated. Thus, for example, at this juncture, computer 20 could determine to begin with component 10c; however, this is merely an example for illustrative purposes.

Figure 13:
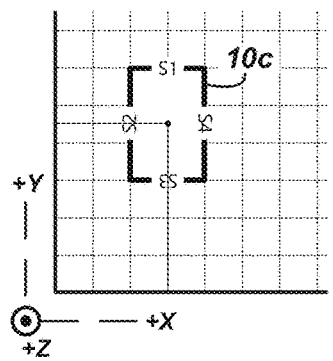
FIG. 13 illustrates a component on a coordinate system.
Figure 14:
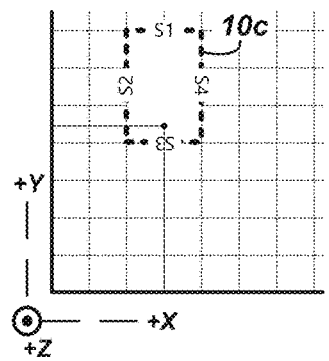
FIGS. 14-17 schematically illustrate an incremental displacement of the component shown in FIG. 13 relative to its position (in FIG. 13).

In block 510 which follows, computer 20 may evaluate displacing component 10c in a coordinate (or axial direction)—e.g., along an x-axis, along a y-axis, or in 3D implementations, along a z-axis. In the present example, computer 20 may evaluate displacement along one of a positive x-direction, a negative x-direction, a positive y-direction, or a negative y-direction according to the step size (STEP). In the first run, the step size is the initial step size ($STEP_0$), as discussed above (e.g., continuing with the example of $STEP_0=4$, then the increment in one of the x- or y-directions is four steps on the 90×40 segmented workspace (e.g., equivalent to 4*50 or 200 segments of the unscaled segmented workspace 12'). FIG. 13 illustrates the randomly positioned and oriented component (per block 360), and FIG. 14 illustrates the increment (here, a displacement in the positive y-direction). Computer 20 may store increment evaluations for the respective run iteration as data (e.g., Table I is illustrative). Table I shows that for the current run and iteration (R=0,1), computer 20 has evaluated a movement of the instant component (e.g., 10c) in the positive y-direction, but not yet evaluated other displacements (or rotations).

TABLE I

| Component: | {10c} |
|---|---|
| Run and iteration: | {0, 1} |
| Evaluation of displacement: | |
| Positive x-direction | FALSE |
| Negative x-direction | FALSE |
| Positive y-direction | TRUE |
| Negative y-direction | FALSE |
| Evaluation of rotation: | |
| 0-degree increment | FALSE |
| 90-degree increment | FALSE |
| 180-degree increment | FALSE |
| 270-degree increment | FALSE |

In block 520, which follows, if all displacements are 'TRUE,' then computer 20 may evaluate component rotations in block 520. If not, computer 20 may perform no evaluations and proceed to block 530. Continuing with the instant example, process 300 skips evaluating block 520 for now and proceeds to block 530.

Figure 18:
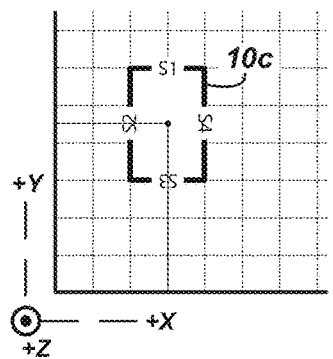
FIG. 18 is identical to FIG. 13.
Figure 19:
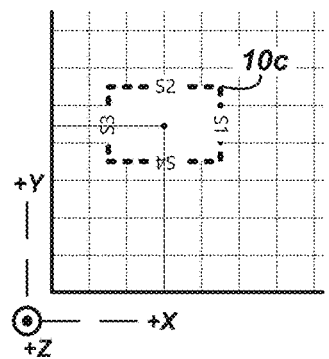
FIGS. 19-21 schematically illustrate an incremental rotation of the component shown in FIG. 18 relative to its position (in FIG. 18).
Figure 20:
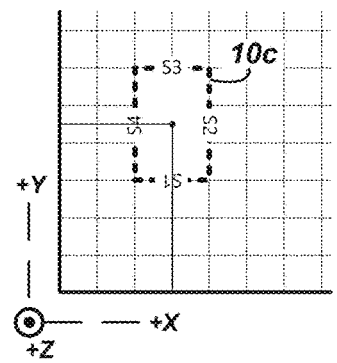
Figure 21:
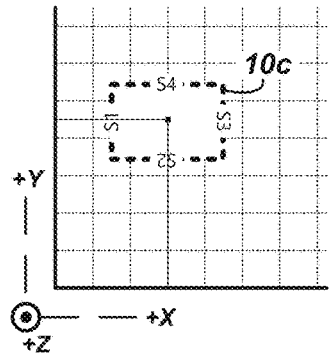

Later in process 300, computer 20 will evaluate (per block 520) the rotations that have not previously been evaluated for the specific component (e.g., 10c) in this run. For example, if all displacements are 'TRUE,' then computer 20 may evaluate a 0-degree rotation increment (FIG. 18). Ultimately, looping through blocks 520-570, all rotation increments may be evaluated (e.g., see FIGS. 19, 20, 21). The degree of rotation (e.g., 90-degree) may be predetermined. Thus, four rotation increments is merely an example; e.g., in other examples, other rotational values may be predetermined (e.g., 45-degree increments, 180-degree increments, etc.).

Next in block 530, computer 20 may determine whether the potential displacement in block 510 or the potential rotation in block 520 violated a predetermined rule set forth earlier—e.g., whether the potential movement or rotation caused a movement into a KO zone 24 or overlap with a boundary (e.g., one of boundaries 22, 26, 30). If the potential displacement or rotation did, then process 300 proceeds to block 540; else, it proceeds to block 550.

In block 540, computer 20 sets the total cost of the jth iteration to a large value (e.g., set $TC_{R(a,b),j}$=large value) based on violation of a KO zone 24 or boundary 22, 26, 30. According to one example, the large value is predetermined; in other examples, it may be calculated. For example, the large value may be 10 or even 100 times larger than any times than any conceivable cost of the component layout within workspace 12' using components 10a-10g (e.g., $50000 or $100000, when the maximum reasonable costs of connections 16 might be $2000). As will be explained more below, any suitably large value (predetermined or calculated) may be used in order to induce the computer 20 (in block 610) to not determine this configuration to be a cost minimization. Block 560 may follow.

In block 550, computer 20 may calculate a total cost for the component layout ($TC_{R(a,b),j}$) per the jth iteration may be calculated, similarly as discussed above in block 440, wherein, in this calculation (and per the instant example, component 10c is displaced in the positive y-direction. Of course, in future iterations of block 550, the instant component may be displaced or rotated differently, or a different component may be positioned and oriented. Block 560 may follow.

In block 560 (which follows block 540 or 550), computer 20 may store (in memory 42) a total cost ($TC_{R(a,b),j}$) for the particular component layout, wherein j refers to an identifier that indicates the position and orientation of all selected components—including the potential new position or orientation of the instant component (e.g., 10c) based on blocks 510 or 520. For example, when block 560 follows block 540, computer 20 may store as $TC_{R(a,b),j}$ the large value determined in block 540. Or when, block 560 follows block 550, computer 20 may store as $TC_{R(a,b),j}$ the value determined (in block 550) following an execution of the pathfinding algorithm (described in block 440). According to at least one example, the $R(a^{th} b^{th})$ and jth indices may be associated with one or more vectors (e.g., such as vectors $\vec{A}$ and $\vec{C}$ described above) so that each component may be identified relative to origin O.

Figure 15:
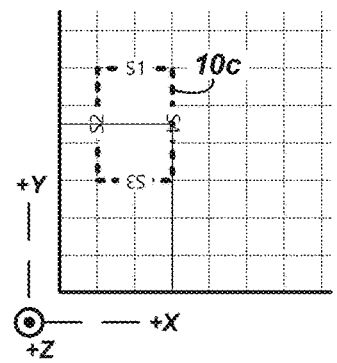
Figure 16:
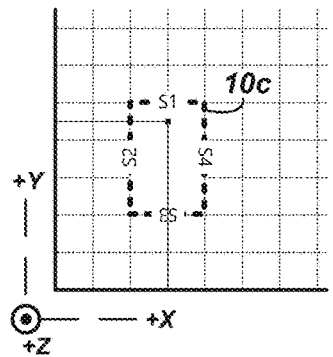
Figure 17:
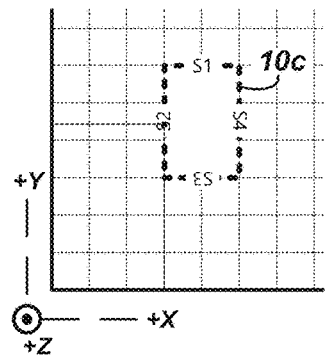

In block 570 which follows block 560, computer 20 may determine—for the instant component (e.g., component 10c)—whether all displacement and rotation increments for the particular run and iteration are completed. If so, the process 300 proceeds to block 580; else, process 300 loops back to block 510 (or block 520). Thereafter, in block 510, computer 20 may displace the component in another direction (e.g., such as one of FIG. 15, 16, or 17). If all displacement iterations are completed for the particular component (e.g., 10c) for the particular run and iteration, then following block 570, computer 20 may loop back to block 520 to rotate the component (e.g., 10c)—e.g., according to a rotation shown in FIG. 18-21. For each displacement and rotation increment, computer 20 may repeat blocks 530, 540 or 550, 560, and 570. This may occur until all the evaluation values for displacement and rotation (e.g., in Table I) have been complete (e.g., are 'TRUE').

Following block 570, process 300 may proceed to block 580. In block 580, computer 20 may determine whether any components selected in block 340 remain to be evaluated (for the instant run and iteration (R(a,b))). If so, process 300 loops back to block 500; else, process 300 proceeds to block 600 (FIG. 6). For instance, continuing with the instant example, computer 20 may determine that components 10a-10b and 10d-10g have yet to be evaluated (in block 580); therefore, proceeding to block 500 again, computer 20 may randomly selected one of components 10a-10b, 10d-10g, and the blocks 510-580 may be iteratively executed, as described above. In at least one example, the evaluation of each of these components may be similar or identical to the evaluation of component 10a; therefore, for sake of brevity, the description of each of 10a-10b, 10d-10g will not be repeated here.

Turning to FIG. 6, in block 600 (which follows block 580), computer 20 may select one of the evaluated component layouts based on total costs ($TC_{R(a,b),j}$) for the instant run (R(a,b)) and for all j. Desirably, computer 20 selects an iteration based on a lowest cost. For instance, in the current example of components 10a-10g (7 different components) evaluating four displacement increments and four 90-degree rotation increments, j may be a value between 1 and 112 (e.g., j: 1 to 112). For illustration purposes only, this particular component layout is designated $TC_{R(a,b),j}*$.

In block 610 which follows, computer 20 may determine whether the selected total cost (of block 600) is less than the previously-selected total initial cost. Continuing with the present example, computer 20 may determine whether total cost ($TC_{R(a,b),j}*$) is less than the initial total cost ($TC_{(0,0),0}$). If it is, then computer 20 proceeds to block 620; else computer 20 may proceed to block 640.

In block 620, computer 20 may update current vehicle workspace 12' with the positions and orientations of the selected components. Continuing with the current example, updating the workspace 12' includes updating the temporary location list ($list_{TEMP}$) by updating the vectors $\vec{A}$ and $\vec{C}$ for each of the components 10a-10g (e.g., replacing the randomly positions determined by the computer 20). It further may include updating the workspace matrix (e.g., the 0s and 1s) according to the new temporary location list ($list_{TEMP}$) (similarly as described in block 420).

Block 630 may follow block 620. In block 630, computer 20 may increment the iteration of the current run (e.g., R(a,b)=R(a,b+1)). E.g., continuing with the instant example, wherein R(a,b)=(0,1), then R(a,b)=(0,2). Of course, in later iterations through block 630, the value of b may increase.

Following block 630, the computer 20 may proceed to block 500 (FIG. 5) and afterwhich, displacement and rotation of each of the selected components are evaluated again. As this may be similar to the previously described blocks, a detailed description here will not be repeated.

Returning to FIG. 6, recall block 640 follows determining that the selected total cost ($TC_{R(a,b),j}*$) is not less than the previously-selected total initial cost (e.g., $TC_{(0,0),0}$). In block 640, computer 20 may determine whether the step size (STEP) may be reduced. Continuing with the example above where STEP=4, the step size may be reduced in any suitable manner provided the new step size is an integer—e.g., the step size could be decreased by 1 (e.g., STEP=STEP−1, so that now STEP=3). This of course is merely an example; the step size could be reduced in other ways. If the computer 20 determines to reduce the step size, then process 300 proceeds to block 650; else, process 300 proceed to block 670.

More particularly, in block 640, computer 20 may store in memory 42 a predetermined minimum step size ($STEP_{MIN}$). According to one example, $STEP_{MIN}$ equals '1.' According to another example, a resolution of the vehicle workspace 12' (e.g., the smallest possible value of a segment 60) may be the minimum step size ($STEP_{MIN}$). Thus, in block 640, computer 20 may compare the minimum step size ($STEP_{MIN}$) to the proposed reduced step size and determine to reduce the step size only if the proposed reduced step size is greater than or equal to the minimum step size ($STEP_{MIN}$).

Continuing with the present example, computer 20 may determine that the step cannot be reduced if decreasing the STEP by one yields a step size less than the minimum step size ($STEP_{MIN}$). Thus, in block 650 which follows block 640, computer 20 determines to reduce the step size and assigns the proposed reduced step size to STEP.

In block 660 which follows, computer 20 may increment the iteration of the run. This block may be identical to block 630 described above; therefore, it will not be re-explained here. Thereafter, process 300 may proceed to block 500 (FIG. 5), as also discussed above.

In block 670 (which may follow block 640), computer 20 has determined that the total cost cannot be further reduced and that the step size cannot be further reduced. Thus, in block 670, data pertaining to the process 300 may be stored in memory 42 and/or database 44; in one example, this data will be exported via output device 48. Block 670 may include storing any data updated in block 620. It could also include storing information regarding any and/or all runs and iterations. Further, it could comprise storing any initialization data (e.g., from block 310). Other data also may be stored.

In block 680 which follows, computer 20 performs a sanity check by evaluating whether the $a^{th}$ run of R(a,b) is greater than the run threshold (e.g., whether the current value of a>$THR_{RUNS}$). If it is, then process 300 may proceed to optional block 695 or alternatively, process 300 may end. If the value of a is not greater than the run threshold ($THR_{RUNS}$), then computer 20 may proceed to block 690 and thereafter block 360 (FIG. 3)—thereby repeating a large portion of process 300 again.

With regard to block 690, through a randomization process (e.g., particularly with respect to initially locating the components 10a-10g), it is possible to execute process 300 and achieve what may be referred to as a local component optimization, as opposed to a global component optimization. Executing too few iterations (b of R(a,b)) is an indicator that this may have occurred. A local optimization occurs when an overall best solution (a global optimization) is not realized, but instead, in a local optimization, the computer 20 clusters components 10 in a manner wherein subsequent blocks do not lead to a global optimization.

Accordingly, in block 690 which follows, the value of a may be incremented—e.g., R(a,b)=R(a+1,b) wherein b is reset to zero (b=0), and process 300 may proceed to block 360 (e.g., performing at least a portion of the re-initialization over again). Thereafter, process 300 may proceeds to blocks 370, 380, 400, etc. Recall in block 400, the components 10a-10g may be randomly positioned and oriented. Thus, process 300 may attempt to a global optimization having a different total cost before terminating.

Block 695 is optional. In block 695, a clustering algorithm may be applied to at least a portion of the data stored in block 670. Using the clustering algorithm, the optimization may be improved. One non-limiting example of a clustering algorithm is a k-means algorithm; however, other examples exist.

It should be appreciated that an output of process 300 may be used by engineers to determine an optimization of the connections 16 which route to, around, between, etc. various structural elements on vehicle 14. Further, the output may not only suggest where to route these connections 16 but also indicate a cost and weight estimate that may be used for system engineering purposes. While not elaborated here, it should be appreciated that the output of the computer-implemented blocks described above may be in any suitable format.

Thus, there has been described a computer-implemented process for identifying the positions and/or orientations of components in a vehicle. More particularly, the process quickly can identify an optimization of the respective positions and orientations of each component.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising:
a processor; and a memory storing instructions executable by the processor, the instructions comprising, to:
receive, as input, a plurality of components for a vehicle workspace;
store, for each of the plurality of components, a first vector and a second vector;
wherein the first vector is a component position vector representative of a first reference point on a respective component that is relative to an origin of the vehicle workspace, and the second vector is a feature position vector representative of a second reference point on a connector of the respective component that is relative to the origin of the vehicle workspace, wherein the feature vector includes one or more connections of the respective component, wherein a plurality of feature position vectors for respective components include a plurality of connections;
determine an optimization of a routing of the plurality of connections, each of which connect to at least one of the plurality of components, wherein determining the optimization includes updating the first vector and the second vector; and
provide an output indicative of the routing within the vehicle workspace.

2. The system of claim 1, wherein each of the plurality of components are associated with dimensions and clearance data.

3. The system of claim 2, wherein the dimensions are two-dimensional or three-dimensional.

4. The system of claim 1, wherein the input further comprises: at least one of a keep-out (KO) zone or component-specific (CS)-zone data.

5. The system of claim 1, wherein receiving as input comprises at least one of: receiving the input from a user, from a computer memory, or from a computer database.

6. The system of claim 1, wherein the workspace is mathematically represented as a workspace matrix comprising segments having values of zero (0) or one (1), wherein, when one of the plurality of components occupy one of the segments, the respective segment's value is assigned to one (1).

7. The system of claim 1, further comprising: randomly positioning the plurality of components into the vehicle workspace.

8. The system of claim 1, further comprising: iteratively moving at least some of the plurality of components within the vehicle workspace.

9. The system of claim 8, wherein iteratively moving further comprises at least one displacement or at least one rotation.

10. The system of claim 8, wherein iteratively moving at least some of the plurality of components occurs via a step size.

11. The system of claim 10, wherein iteratively moving at least some of the plurality of components over a plurality of runs, wherein the step size decreases over at least some of the plurality of runs.

12. The system of claim 1, wherein determining the optimization further comprises using a pathfinding algorithm.

13. The system of claim 1, wherein determining the optimization further comprises determining a total cost associated with a first component layout within the workspace and comparing it with a total cost of a second component layout within the workspace, wherein the second component layout includes a movement of at least one of the plurality of components relative to the first component layout.

14. The system of claim 1, wherein determining the optimization further comprises using at least one cost factor.

15. The system of claim 14, wherein the at least one cost factor is associated with: a cost of the plurality of connections, a weight of the plurality of connections, a corrosion of at least one of the plurality of connections, a thermal-shield of at least one of the plurality of connections, a supplier sourcing of at least one of the plurality of connections, an assembly of at least one of the plurality of connections, a repair of at least one of the plurality of connections, a crash of at least one of the plurality of connections, or a governmental regulation of at least one of the plurality of connections.

16. The system of claim 1, wherein determining the optimization further comprises applying a shrinking factor to the vehicle workspace.

17. The system of claim 1, wherein the instructions further comprise, to: iteratively move at least some of the plurality of components within the vehicle workspace.

18. The system of claim 1, wherein the feature vector further includes, for the respective component in addition to the at least one connector, one or more of: a component identifier, one or more dimensions of the component; a mask describing a component shape, and a modified mask describing a modified component shape.

* * * * *